(12) United States Patent
Hwang et al.

(10) Patent No.: US 10,574,599 B2
(45) Date of Patent: Feb. 25, 2020

(54) METHOD, SYSTEM AND RECORDING MEDIUM FOR PROVIDING CONTENTS IN MESSENGER

(71) Applicant: LINE Corporation, Tokyo (JP)

(72) Inventors: Tae Hwan Hwang, Seongnam-si (KR); Seok Chan Lee, Seongnam-si (KR)

(73) Assignee: LINE Corporation, Tokyo (JP)

( * ) Notice: Subject to any disclaimer, the term of this patent is extended or adjusted under 35 U.S.C. 154(b) by 106 days.

(21) Appl. No.: 14/840,756

(22) Filed: Aug. 31, 2015

(65) Prior Publication Data

US 2016/0344663 A1 Nov. 24, 2016

(30) Foreign Application Priority Data

May 21, 2015 (KR) .......... 10-2015-0070932

(51) Int. Cl.
H04L 12/58 (2006.01)
(52) U.S. Cl.
CPC .............. *H04L 51/04* (2013.01); *H04L 51/10* (2013.01); *H04L 51/16* (2013.01)
(58) Field of Classification Search
CPC .......... H04L 51/04; H04L 51/10; H04L 51/16
See application file for complete search history.

(56) References Cited

U.S. PATENT DOCUMENTS 8,700,776 B2 * 4/2014 Rasmussen ........... H04L 51/043
709/207
2004/0205515 A1 * 10/2004 Socolow ................. G06F 17/24
715/202
2006/0089820 A1 * 4/2006 Yu .......................... G06Q 10/10
702/186
2010/0138756 A1 * 6/2010 Saund ..................... H04L 51/04
715/758
2011/0320273 A1 * 12/2011 Miranda-Steiner ..... H04L 51/04
705/14.49

FOREIGN PATENT DOCUMENTS

JP        H11-003348 A    1/1999
JP        2004-290269     10/2004
(Continued)

OTHER PUBLICATIONS

Korean Office Action issued in Korean Patent Application No. 10-2015-0070932, dated Feb. 3, 2016.
(Continued)

*Primary Examiner* — Nam T Tran
(74) *Attorney, Agent, or Firm* — Harness, Dickey & Pierce, P.L.C.

(57) ABSTRACT

A contents providing method is implemented with a computer including at least one processor and a memory. The method includes: registering contents by matching time information with data received from a first user terminal, and storing the data in association with the time information; receiving a request for access to the registered contents; establishing a conversation interface with a messenger account related to the registered contents in response to the request for access; and reproducing the registered contents as a real-time conversation by providing the data through the conversation interface in an order corresponding to the time information.

18 Claims, 10 Drawing Sheets

(56) References Cited

FOREIGN PATENT DOCUMENTS

| | | | |
|---|---|---|---|
| JP | 2008078864 | A | 4/2008 |
| JP | 2008-278271 | | 11/2008 |
| JP | 2010-073192 | | 4/2010 |
| JP | 2014-510506 | | 4/2014 |
| KR | 10-2002-0074304 | A | 9/2002 |
| KR | 2002-0074304 | A | 9/2002 |
| KR | 20040090219 | A | 10/2004 |
| KR | 20090002258 | A | 1/2009 |
| KR | 100974999 | B1 | 8/2010 |
| KR | 101314025 | B1 | 10/2013 |

OTHER PUBLICATIONS

Office Action dated Dec. 6, 2016 in Japanese Patent Application No. 2016-023260.

* cited by examiner

METHOD, SYSTEM AND RECORDING MEDIUM FOR PROVIDING CONTENTS IN MESSENGER

CROSS-REFERENCE TO RELATED APPLICATIONS

This application claims priority under 35 U.S.C. § 119 to Korean Patent Application No. 10-2015-0070932, filed May 21, 2015, in the Korean Intellectual Property Office, the entire contents of which are incorporated herein by reference.

BACKGROUND

Field

Example embodiments of inventive concepts relate to techniques for providing contents through an instant messenger (IM).

Description of Related Art

An instant messenger (IM) is a conventional communication tool that sends and receives messages and data in real time. An instant messenger may allow a user to register a chat counterpart on a messenger, and to send and receive messages with the chat counterpart in real time.

This messenger function may be widely used in mobile communication terminals as well as personal computers. For example, disclosed in the Korean Patent Publication No. 2002-0074304 are a mobile messenger service system and method for a mobile terminal using a wireless communication network, which allow a messenger service to be provided among mobile messengers installed on mobile terminals.

A related art instant messenger (IM) may provide a data transmission service, which transmits and receives data such as pictures, video, music and the like, as well as providing a chatting service that allows users to perform chatting using a text, voice, and the like.

SUMMARY

One or more example embodiments of inventive concepts provide contents providing methods, systems and/or recording mediums, capable of making and providing contents of a messenger conversation form.

One or more example embodiments of inventive concepts provide contents providing methods, systems and/or recording mediums, capable of providing contents, configured in a time line format, in a real-time dialog type One or more example embodiments of inventive concepts provide contents providing methods, systems and recording mediums, capable of providing contents, obtained by reconstructing conversation contents in time order at reviewing of the conversation contents in a messenger, in a real-time conversation format.

At least one example embodiment provides a contents providing method implemented with a computer including at least one processor and a memory, the method comprising: registering contents by matching time information with data received from a first user terminal, and storing the data in association with the time information; receiving a request for access to the registered contents; entering a conversation interface associated with a messenger account related to the registered contents in response to the request for access; and reproducing the registered contents as a real-time conversation by providing the data through the conversation interface in an order corresponding to the time information.

According to at least some example embodiments, the registering contents may include: matching a conversation message of a virtual person input by a first user with a time input by the first user; and storing the matched conversation message.

According to at least some example embodiments, the registering contents may include: matching a conversation message with a conversation time in a messenger installed at the first user terminal; and storing the matched conversation message.

According to at least some example embodiments, the reproducing the registered contents may include: reconstructing the data in a time sequence matched to the data provided through the conversation interface; and displaying the reconstructed data sequentially based on time intervals between the data.

According to at least some example embodiments, the method may further include displaying advertisement information related to the registered contents through the conversation interface.

According to at least some example embodiments, the method may further include displaying an advertisement among the registered contents while reproducing the registered contents.

According to at least some example embodiments, the method may further include: selecting the advertisement according to a keyword included in the data.

According to at least some example embodiments, the entering a conversation interface may include entering the conversation interface at a time corresponding to a set reproduction time for the registered contents.

According to at least some example embodiments, the entering a conversation interface may include entering the conversation interface in response to selection of a conversation message from a storage box in which the conversation message is stored.

According to at least some example embodiments, the entering a conversation interface may include entering the conversation interface in response to selection of at least one of a special conversation interface and a special conversation message, the selection of the at least one of the special conversation interface and the special conversation message resulting from a search for the at least one of the special conversation interface and the special conversation message on a messenger. The conversation interface may at least one of (i) be the special conversation interface and (ii) include the special conversation message.

At least one other example embodiment provides a contents providing method implemented by a computer including at least one processor and a memory, the method comprising: receiving, from a user terminal, a request to reproduce contents including matched data and time information; entering, based on the request, a conversation interface with a messenger account related to the contents; and reproducing the contents as a real-time conversation by displaying the matched data through the conversation interface sequentially in an order corresponding to the time information.

At least one other example embodiment provides a non-transitory computer-readable recording medium storing computer-executable instructions that, when executed, cause a computer, including at least one processor and a memory, to perform a method comprising: registering contents by matching time information with data received from a first user terminal, and storing the data in association with the time information; receiving a request for access to the registered contents; entering a conversation interface associated with a messenger account related to the registered contents in response to the request for access; and reproducing the registered contents as a real-time conversation by providing the data through the conversation interface in an order corresponding to the time information.

At least one other example embodiment provides a contents providing system comprising: a memory having computer-readable instructions stored therein; and at least one processor. The at least one processor is configured to execute the computer-readable instructions to: register contents by matching time information to data received from a first user terminal, and storing the data in association with the time information; provide a conversation interface with a messenger account related to the registered contents in response to a request for access to the registered contents; and reproduce the registered contents as a real-time conversation by providing the data through the conversation interface in an order corresponding to the time information.

According to at least some example embodiments, the at least one processor may be further configured to execute the computer-readable instructions to: match a conversation message of a virtual person input by a first user with a time input by the first user; and store the matched conversation message in the memory.

The at least one processor may be further configured to execute the computer-readable instructions to: match a conversation message with a conversation time in a messenger installed at the first user terminal; and store the matched conversation message in the memory.

The at least one processor may be further configured to execute the computer-readable instructions to: reconstruct the data in a time sequence matched to the data provided through the conversation interface; and display the reconstructed data sequentially based on time intervals between the data.

The at least one processor may be further configured to execute the computer-readable instructions to display advertisement information related to the registered contents through the conversation interface.

The advertisement information may include at least one of: an advertisement inserted at a first time among the reproduced contents; and an advertisement selected according to a keyword included in the data.

The at least one processor may be further configured to execute the computer-readable instructions to provide the conversation interface at a time corresponding to a set reproduction time for the registered contents.

The conversation interface may include a special conversation message; and the at least one processor may be further configured to execute the computer-readable instructions to provide the conversation interface including the special conversation message in response to selection of the special conversation message from one of (i) a search result for the special conversation message on the messenger and (ii) a storage box in which the special conversation message of the messenger is stored.

At least one other example embodiment provides a contents providing method implemented with a computer including at least one processor and a memory, the method comprising: registering contents by matching time information with data received from a first user terminal, and storing the data in association with the time information; receiving a request for access to the registered contents; establishing a conversation interface with a messenger account related to the registered contents in response to the request for access; and reproducing the registered contents as a real-time conversation by providing the data through the conversation interface in an order corresponding to the time information.

According to at least some example embodiments, the registering contents may include: matching a conversation message of a virtual person input by a first user with a time input by the first user; and storing the matched conversation message.

The registering contents may include: matching a conversation message with a conversation time in a messenger installed at the first user terminal; and storing the matched conversation message.

The reproducing the registered contents may include: reconstructing the data in a time sequence matched to the data provided through the conversation interface; and displaying the reconstructed data sequentially based on time intervals between the data.

According to at least some example embodiments, the method may further include displaying advertisement information related to the registered contents through the conversation interface.

According to at least some example embodiments, the method may further include displaying an advertisement among the registered contents while reproducing the registered contents.

According to at least some example embodiments, the method may further include selecting the advertisement according to a keyword included in the data.

The establishing a conversation interface may include establishing the conversation interface at a time corresponding to a set reproduction time for the registered contents.

The establishing a conversation interface may include establishing the conversation interface in response to selection of a conversation message from a storage box in which the conversation message is stored.

The establishing a conversation interface may include: establishing the conversation interface in response to selection of at least one of a special conversation interface and a special conversation message, the selection of the at least one of the special conversation interface and the special conversation message resulting from a search for the at least one of the special conversation interface and the special conversation message on a messenger; wherein the conversation interface at least one of (i) is the special conversation interface and (ii) includes the special conversation message.

At least one other example embodiment provides a contents providing method implemented by a computer including at least one processor and a memory, the method comprising: establishing, based on a request for reproducing contents including matched data and time information from a user, a conversation interface with a messenger account related to the contents; and reproducing the contents as a real-time conversation by displaying the matched data through the conversation interface sequentially in an order corresponding to the time information.

At least some other example embodiments provide a contents providing system comprising: a memory having computer-readable instructions stored therein; and at least one processor. The at least one processor is configured to execute the computer-readable instructions to: register contents by matching time information to data received from a first user terminal, and storing the data in association with the time information; provide a conversation interface with a messenger account related to the registered contents in response to a request for access to the registered contents; and reproduce the registered contents as a real-time conversation by providing the data through the conversation interface in an order corresponding to the time information.

According to at least some example embodiments, the at least one processor may be further configured to execute the computer-readable instructions to: match a conversation message of a virtual person input by a first user with a time input by the first user; and store the matched conversation message in the memory.

The at least one processor may be further configured to execute the computer-readable instructions to: match a conversation message with a conversation time in a messenger installed at the first user terminal; and store the matched conversation message in the memory.

The at least one processor may be further configured to execute the computer-readable instructions to: reconstruct the data in a time sequence matched to the data provided through the conversation interface; and display the reconstructed data sequentially based on time intervals between the data.

The at least one processor may be further configured to execute the computer-readable instructions to display advertisement information related to the registered contents through the conversation interface.

The advertisement information may include at least one of: an advertisement inserted at a first time among the reproduced contents; and an advertisement selected according to a keyword included in the data.

The at least one processor may be further configured to execute the computer-readable instructions to provide the conversation interface at a time corresponding to a set reproduction time for the registered contents.

The conversation interface may include a special conversation message. The at least one processor may be further configured to execute the computer-readable instructions to: provide the conversation interface including the special conversation message in response to selection of the special conversation message from one of (i) a search result for the special conversation message on the messenger and (ii) a storage box in which the special conversation message of the messenger is stored.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
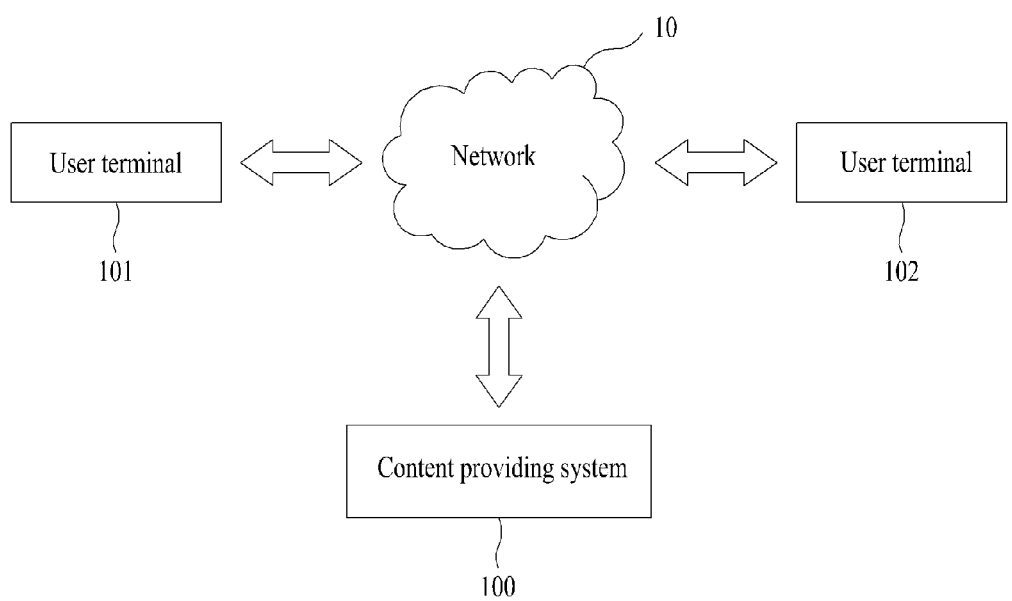
FIG. 1 is a diagram illustrating a contents providing environment according to an example embodiment of inventive concepts.

Example embodiments will be described in detail with reference to the accompanying drawings. Inventive concepts, however, may be embodied in various different forms, and should not be construed as being limited only to the illustrated example embodiments. Rather, these embodiments are provided as examples so that this disclosure will be thorough and complete, and will fully convey inventive concepts to those skilled in the art. Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In the description below, it will be understood that when an element such as a layer, region, substrate, plate, or member is referred to as being "on" another element, it can be directly on the other element or intervening elements may be present. In contrast, the term "directly" means that there are no intervening elements.

Below, some example embodiments of inventive concepts will be described in detail with reference to accompanying drawings.

Example embodiments of inventive concepts may relate to technologies for providing contents through an instant messenger (IM), and in detail, to media platforms, which may provide tools for making and/or generating conversation forms of contents, and may provide the created contents in a real-time conversation form in a dialog window of a messenger.

FIG. 1 is a diagram illustrating a contents providing environment according to an example embodiment of inventive concepts. In FIG. 1, there are illustrated user terminals 102 and 102 and contents providing system 100. Arrows in FIG. 1 mean that data is transmitted and received using a wired or wireless network 10.

The user terminals 101 and 102 may include one or more processes configured to perform one or more of features described herein. The user terminals 101 and 102 may mean all terminal apparatuses that connect to a web/mobile site associated with the contents providing system 100 or install and execute a service-dedicated application. In this case, the user terminals 101 and 102 may perform an overall operation of a service including service screen construction, a data input, data communication, data storage, and the like, under a control of the web/mobile site or the service-dedicated applications.

The user terminals 101 and 102 may be, for example, a personal computer (PC), a note computer, a laptop computer, a smart phone, a tablet, or a wearable computer. However, the scope and spirit of inventive concepts should not be limited thereto.

The user terminals 101 and 102 may be coupled to a network 10 (e.g., an internet, a local area network, or the like) directly or indirectly. For example, the personal computer and the notebook computer may be directly coupled to the network 10 through the wired network connection. The laptop computer may be wirelessly coupled to the network through a wireless communication channel established between the laptop computer and a wireless access point (WAP). The smart phone may be wirelessly coupled to the network 10 through the wireless communication channel established between the smart phone and a cellular network/bridge. In this case, the network 10 may communicate with one or more secondary networks. The secondary networks may include, for example, a local area network, a wide area network, or an intranet. However, the scope and spirit of inventive concepts should not be limited thereto.

The user terminals 101 and 102 may interface with the contents providing system 100 through the network 10 described above.

The contents providing system 100 may execute one or more processes configured to perform one or more of features described herein. The contents providing system 100 may be implemented on a messenger platform to provide a messenger service, and may provide an environment for making and reproducing contents through the messenger with respect to the user terminals 101 and 102 as clients using the messenger service. In particular, for example, the contents providing system 100 may provide a tool for making a messenger conversation format of contents through the messenger, and may provide contents, configured in a time line format, in real time conversation form in a messenger dialog window.

The contents providing system 100 may correspond to a server computer. The server computer may include, for example, a server computing device, a personal computer, a server computer, a series of server computers, a mini computer, and/or a main frame computer. However, the scope and spirit of inventive concepts should not be limited thereto. The server computer may be a distributed system, and operations of the server computer may be executed concurrently, simultaneously and/or sequentially on one or more processors.

The contents providing system 100 may be implemented such that it is included in a platform of a messenger server (not illustrated) to provide messenger service. However, the scope and spirit of inventive concepts should not be limited thereto. The contents providing system 100 may be implemented in a system separated from the messenger server, and may also be implemented to provide the conversation contents in connection with the messenger server. Then, the contents providing system 100 may be implemented in an application form installed on the user terminals 101 and 102, or it may be implemented such that it is included in a platform to provide a service in a client-server environment.

As described above, the contents providing system 100 may interface with the user terminals 101 and 102 through the network 10. However, the scope and spirit of inventive concepts should not be limited thereto. The contents providing system 100 may be implemented in an application form on the user terminals 101 and 102 to create and reproduce a messenger conversation form of contents in a local environment.

Figure 2:
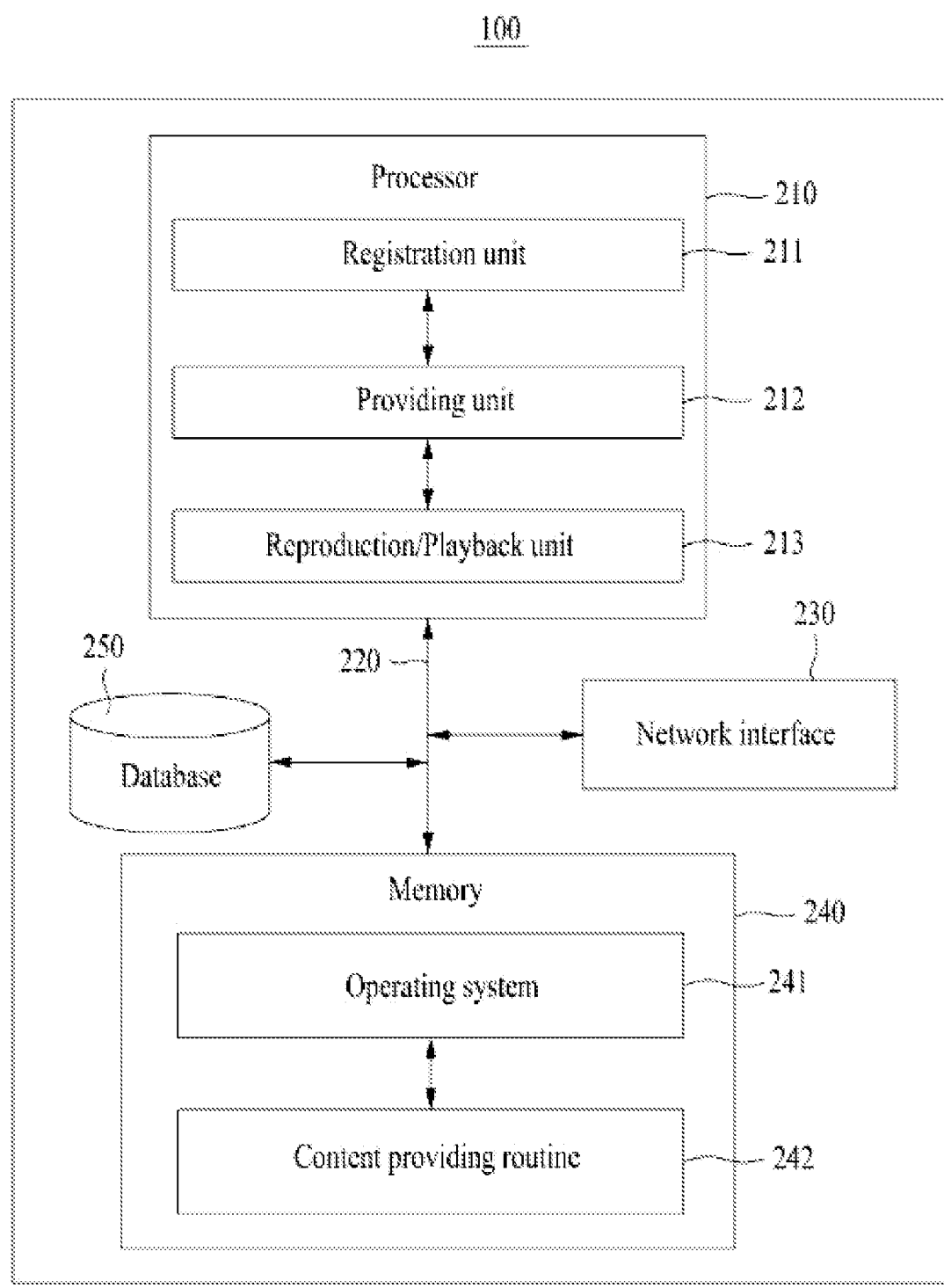
FIG. 2 is a block diagram illustrating an example of an internal configuration of a contents providing system according to an example embodiment of inventive concepts.
Figure 3:
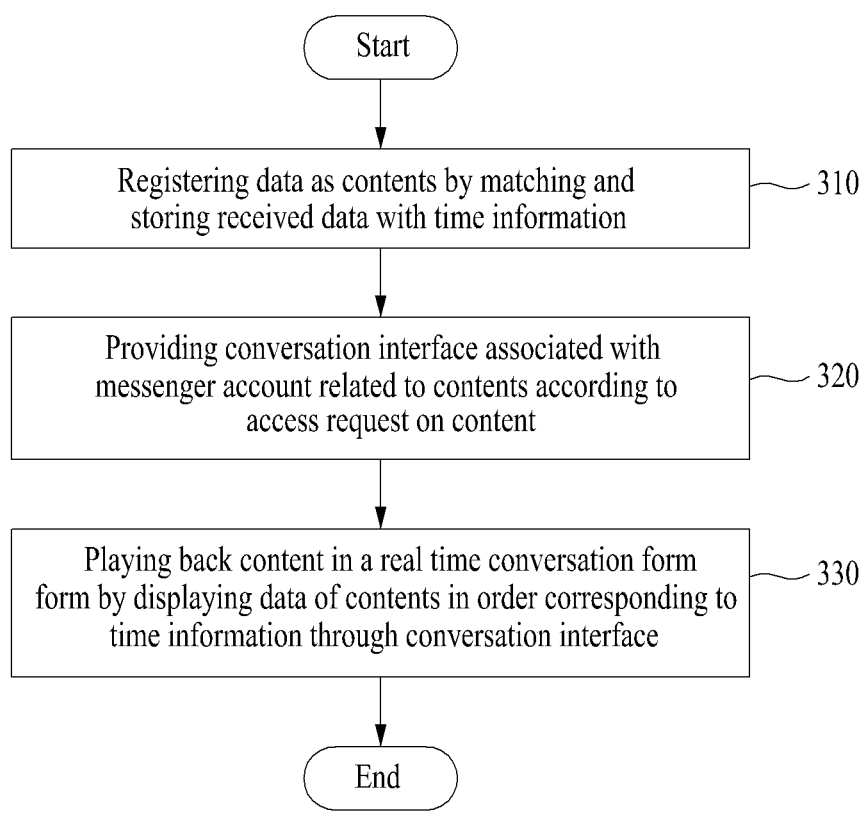
FIG. 3 is a flow chart illustrating a contents providing method according to an example embodiment of inventive concepts.

FIG. 2 is a block diagram illustrating an example of an internal configuration of contents providing system according to an example embodiment of inventive concepts, and FIG. 3 is a flow chart illustrating a contents providing method according to an example embodiment of inventive concepts.

According to at least some example embodiments of inventive concepts, a contents providing system 100 may include a processor 210, a bus 220, a network interface 230, a memory 240, and database 250. The memory 240 may include an operating system 241 and contents providing routine 242. The processor 210 may include a registration unit 211, a providing unit 212, and a reproduction (or playback) unit 213.

In at least one other example embodiment, the contents providing system 100 may include components of which the number is more than that of components illustrated in FIG. 2. However, it may be unnecessary to denote conventional components clearly. For example, the contents providing system 100 may include other components such as a display, transceiver, and the like.

The memory 240, which is a computer-readable recording medium, may include a permanent mass storage device such as a random access memory (RAM), a read only memory (ROM), and a disk drive. In addition, a program code for the operating system 241 and the contents providing routine 242 may be stored in the memory 240. These software components may be loaded from a separate computer-readable recording medium independent of a memory 240 using a drive mechanism (not illustrated). The separate computer-readable recording medium may include a recording medium such as a floppy drive, a disk, a tape, a DVD/CD-ROM drive, a memory card, and the like.

In at least one other example embodiment, software components may be loaded to the memory 240 through the network interface 230, not the computer-readable recording medium.

The bus 220 may enable communications and a data transfer between components of the contents providing system 100. The bus 200 may be implemented by using a high-speed serial bus, a parallel bus, a storage area network (SAN), and/or other communication technology.

The network interface 230 may be a computer hardware component for coupling the contents providing system 100 to the computer network. The network interface 230 may connect the contents providing system 100 to the computer network through wireless or wired connection.

The database 250 may store and maintain the messenger conversation form of contents. In this case, the contents may include contents inputted and made by contents provider such as a user or a professional writer using a messenger through a tool on the messenger, and furthermore, may include interactive contents as a general conversation message, which is exchanged between the users through the messenger. A production type of contents may be made in a conversation form of contents by inputting a message or sticker of a timeline form based on a story scenario by the contents provider. In this way, the contents stored in the database 250 may basically include time information. In the conversation form of content, time information may be included by constructing a story in a time line according to the scenario by the contents provider. In the conversation contents, time (e.g., chat/conversation time) when a real message or data is sent and received may be stored through the messenger, thereby making it possible to manage the contents stored in the database 250 based on time information. Further, the conversation contents may be divided and managed into pieces of contents based on date, chat counterpart, tag, and the like. Furthermore, when pieces of contents are in the database 250, images, photos, video, files, and the like, included in the contents may be stored together. For example, in case of a sticker image, identification information (e.g., ID or the like) of the sticker image and the like may be included and stored.

As illustrated in FIG. 2, the database 250 may be built in to the contents providing system 100. However, the scope and spirit of inventive concepts should not be limited thereto. The database 250 may be omitted depending on system implementation and environment, or all or a part of the database 250 may be implemented with an external database constructed on a separate system. Alternatively, the database 250 may be implemented by a local database included in an application installed on the user terminals 101 and 102.

A processor 210 may be implemented to process an instruction of a computer program by performing a basic arithmetic operation, a logic operation, an input/output operation of the contents providing system 100. The instruction may be provided to the processor 210 through the bus 220, the memory 240 or the network interface 230. The processor 210 may be configured to execute a program code for the registration unit 211, the providing unit 212 and the reproduction unit 213. This program code may be stored in a recording device such as the memory 240.

The registration unit 211, the providing unit 212 and the reproduction unit 213 may be configured to perform steps 310 to 330 in FIG. 3.

In step 310, the registration unit 211 may receive data from a terminal of contents provider, may match and store the received data with time information, and may register the data as contents. In this case, the time information may mean a time when data is inputted by the contents provider, or may mean a time when each piece of data is received. In addition, the registration unit 211 may store and maintain contents in connection with a messenger account of the contents provider. For example, the registration unit 211 may provide a separate tool for making the contents to all users with the messenger account, and in this case, the tool may include a form and a menu which allow a user to input data, such as a message, sticker, or the like, in a time line form. In other words, the contents creation tool may include a function for inputting data, a function for inputting time information by the data, and a function for inputting whether or not of character or text information by the data. When the contents provider inputs data, such as a message, a sticker and the like, in a timeline form through the contents creation tool, data may be automatically matched and registered with the time information, thereby making it possible to create a conversation form of contents with the lapse of time.

In at least one other example embodiment, the registration unit 211 may provide a function for storing the conversation contents of a messenger to all users with the messenger account, thereby making it possible to register the conversation contents of the messenger as contents associated with a user. In this case, the registration unit 211 may specify a section of conversation contents, which a user intends to store, from among the conversation contents of the messenger, and may register the conversation contents in the specified section as the contents. The conversation contents of the messenger may be stored on a messenger service as online contents. However, the scope and spirit of inventive concepts should not be limited thereto. For example, the conversation contents of the messenger may be stored on a user terminal as local contents.

In step 320, when an access request for contents registered in step 310 is received from a terminal of the contents provider or other user, the providing unit 212 may establish a conversation interface with the messenger account related to the contents. In other words, the providing unit 212 may provide a messenger conversation window with the messenger account related to the contents depending on the access request. For example, when the contents are made with media opened in real time at a specific time zone, the providing unit 212 may provide the messenger conversation window with the messenger account related to the contents to a user terminal, which accesses the contents at a corresponding time zone, or a user terminal which requests a subscription on the contents in advance.

In at least one other example embodiment, when the contents are the conversation contents of the messenger, the user may access the conversation contents in a form to review request, and in this case, the providing unit 212 may provide the messenger conversation window including the conversation contents depending on the review request of the user. When the messenger account related to the contents is associated with a user (e.g., a friend) requesting an access, the providing unit 212 may provide the conversation window. However, the scope and spirit of inventive concepts should not be limited thereto. For example, even though the relationship is set without considering a media characteristic, it may be also possible to provide a conversation window once through a temporary relationship setting.

In step 330, the reproduction unit 213 may provide data of the contents through a conversation interface with the messenger account related to the contents in an order corresponding to time information, thereby making it possible to reproduce the contents in a real-time conversation form with the lapse of time. That is, for example, the reproduction unit 213 may not collectively display the data of the contents to the conversation window to verify the data through a scroll, but it may sequentially display the data of the contents through reconstruction according to a time order to verify data sequentially displayed with the lapse of time without using a scroll, thereby making it possible to provide contents in a real-time conversation form. Likewise, stored conversation contents may be reproduced according to a time sequence and a time interval at conversation to perform review on the conversation contents of the messenger, with respect to the conversation contents of the messenger as well as the contents created to include time information through the contents creation tool.

According to one or more example embodiments of inventive concepts, a story created in a conversation form may be provided to a user in the real-time conversation form. The messenger conversation contents between users may be also reconstructed in a time sequence, and the reconstructed result may be provided in a replay form.

Figure 4:
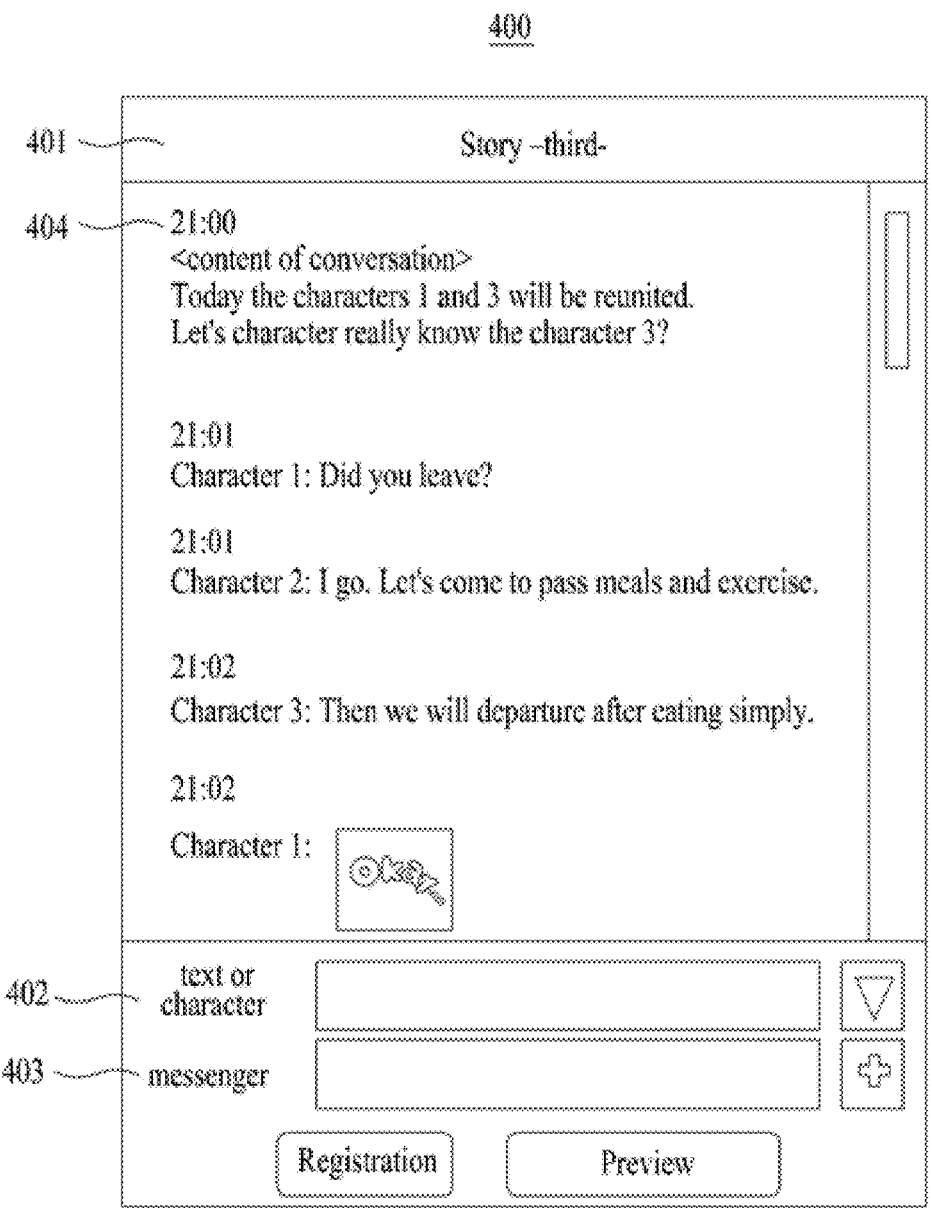
FIG. 4 is an example diagram illustrating an example service page that is displayed on a user terminal as a user interface associated with a contents registration procedure of a registration unit.

FIG. 4 is an example diagram illustrating an example of a service page that is displayed on a user terminal as a user interface associated with contents registration procedure of a registration unit 211.

FIG. 4 illustrates contents production screen 400. As described in FIG. 4, the contents production screen 400 may provide a contents creation tool including a form and menu allowing a contents provider to make a story in a conversation form and may include a menu 401 for inputting basic information including a title, a piece, and the like of the contents, a menu 402 for inputting a text or a character, a menu 403 for inputting a message of each text or character, and a menu 404 for inputting time information by the message. In this case, the menu 403 for inputting the message may provide an environment for inputting all data attachable in the messenger, such as images (e.g., a sticker and the like), photos, videos, files, links and the like, as well as text. In addition, the menu 404 for inputting the time information may input a time of conversation message within a special time zone when the contents are broadcasted. For example, when the contents are broadcasted during 30 minutes from 9 pm every Monday, the time of the message may be inputted within 30 minutes from 9 pm. Furthermore, a menu for inserting an advertisement (e.g., PPL) in the middle of a story may be added to the contents production screen 400. The contents provider may construct and input, in a time sequence, dialogs of a variety of characters based on a story scenario, thereby making it possible to create and register a conversation form of contents.

FIGS. 5 to 9 are diagrams illustrating example service pages displayed on a user terminal as a user interface associated with a contents reproduction procedure of a reproduction unit 213.

Figure 5:
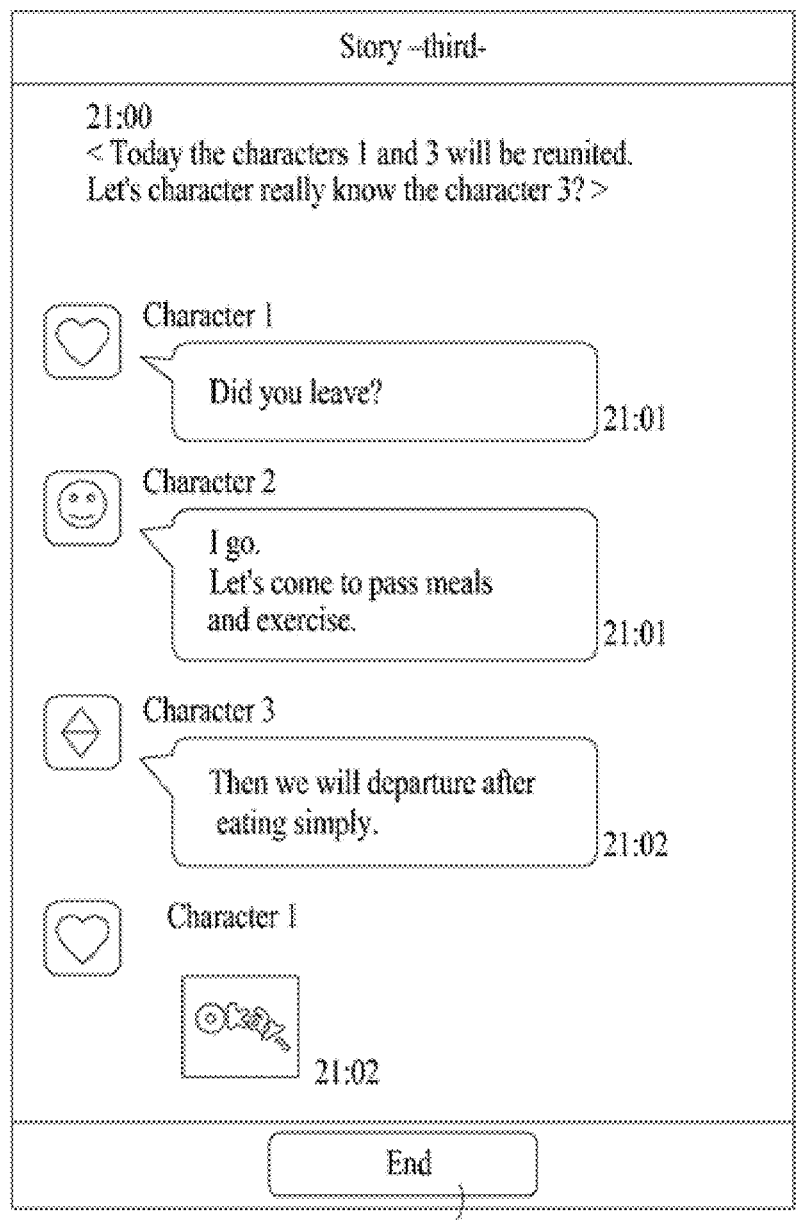
FIGS. 5 to 9 are diagrams illustrating example service pages displayed on a user terminal as a user interface associated with a contents reproduction procedure of a reproduction unit.
Figure 6:
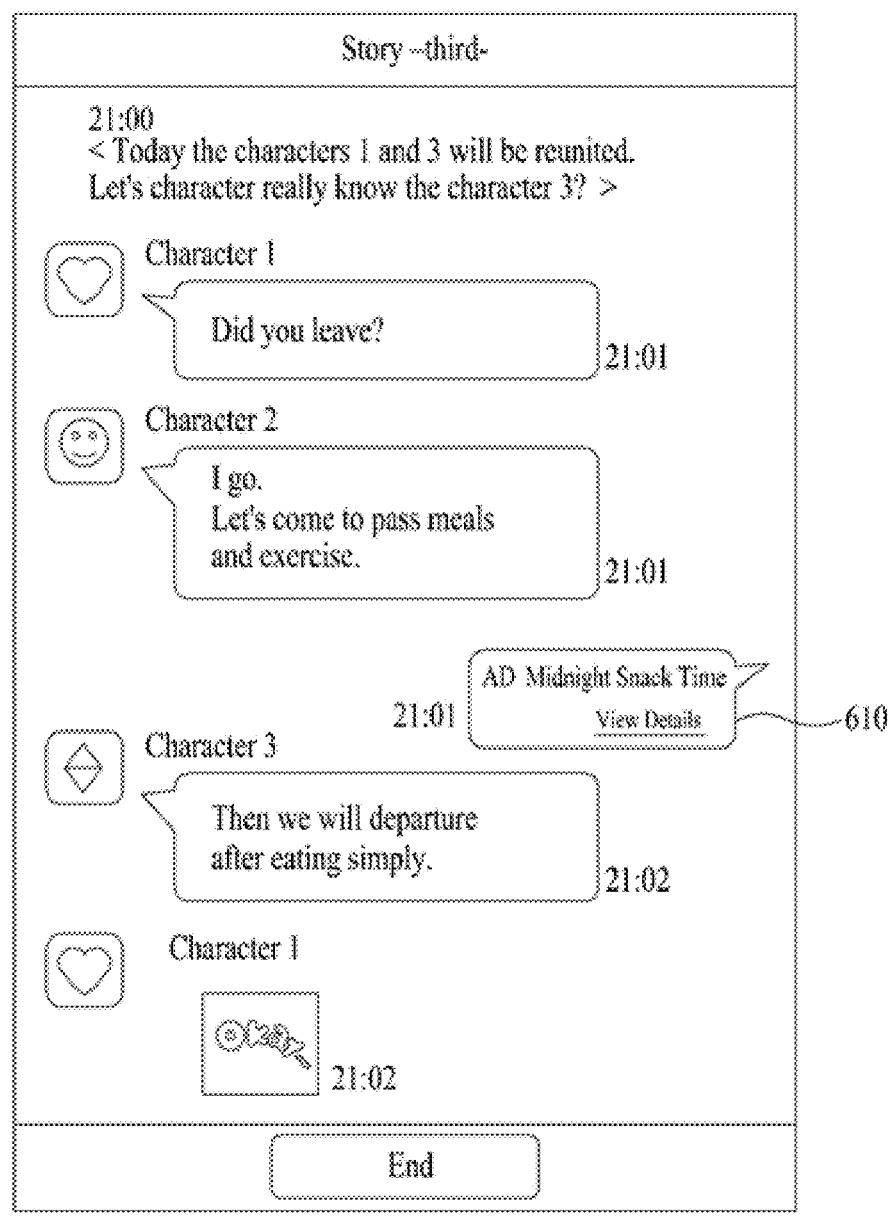
Figure 7:
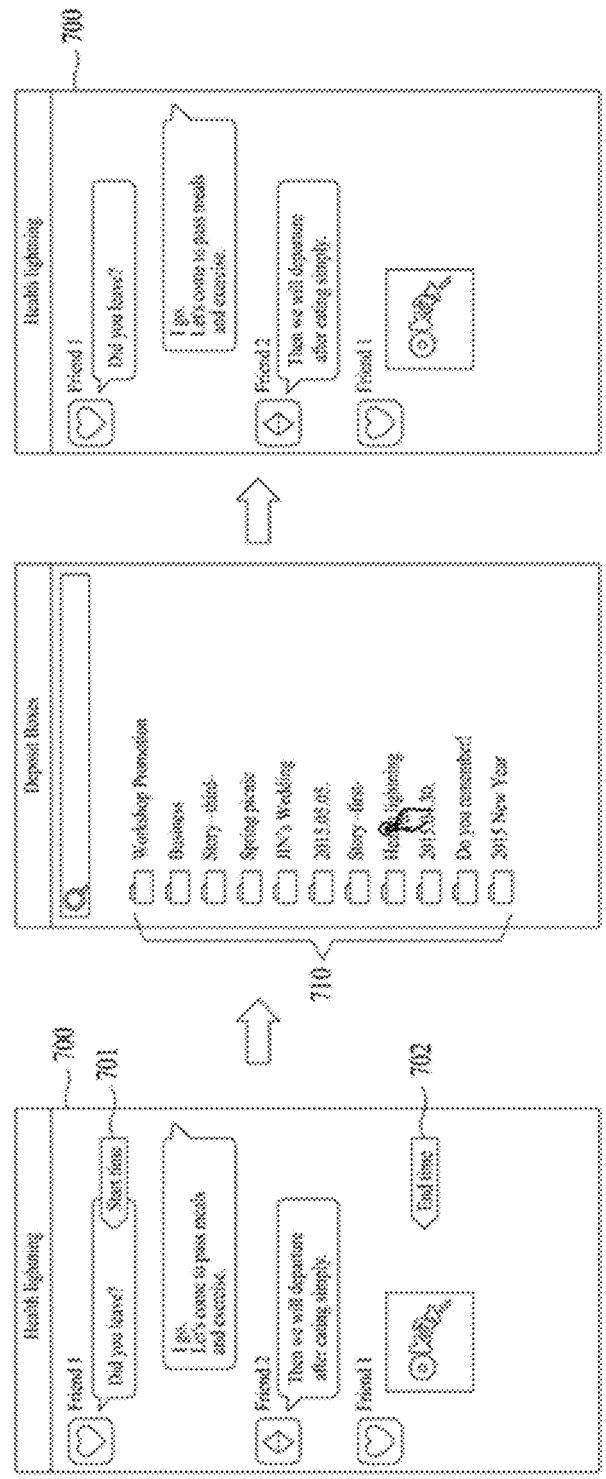

FIG. 5 illustrates contents reproduction screen 500. Referring to FIG. 5, as a conversation interface of the messenger account related to the contents, the contents reproduction screen 500 may be provided to the user terminal corresponding to a broadcasting target of contents at a specific time zone, and data of the contents may be provided through the contents reproduction screen 500 in a time sequence input in making the contents so as to be reproduced in a real-time conversation form. That is, for example, if a contents provider inputs the conversation contents by the virtual person and sets up time of the conversation contents, the messenger conversation window related to the contents may be provided at the special time zone, and contents of the real-time conversation form may be reproduced in the form of transmitting the conversation contents at a conversation window in real time based on time of the conversation contents. The contents reproduction screen 500 may include a menu 501 for ending the reproduction of the contents.

The reproduction unit 213 may display the advertisement related to the contents during reproducing the contents through the contents reproduction screen. In this case, the advertisement may include advertisement (e.g., PPL and the like) directly inserted to the contents by the contents provider and an advertisement (e.g., a keyword advertisement and the like) automatically selected from a system based on the conversation contents. For example, as described in FIG. 6, a keyword "meal" may be inserted by the contents provider in real-time conversation being reproduced through the contents reproduction screen 600, and advertisement information 610 selected according to a given (or, alternatively, desired or predetermined) reference may be displayed. The advertisement 610 may include a link and the like for moving to a web/app linked to a product of the advertisement.

Furthermore, the reproduction unit 213 may reconstruct the conversation contents of the messenger, stored at the user terminal or a server, in a conversation time sequence, and the reconstructed result may be reproduced in a way such that real-time conversation is replayed. For example, referring to FIG. 7, according to example embodiments of inventive concepts, a separate storage function may be provided, and the user may assign a region for storing a desired portion of the conversation contents of the messenger to store it at a separate storage box. For example, when the user long touches any position of a dialog window 700 of the messenger, user interfaces 701 and 702 may be activated for the user to select each of the start and end points of a region to be stored, and in this case, when assigning the start point and the end point of the region to be stored through the user interfaces 701 and 702, the conversation contents of the region may be stored at the storage box. The stored conversation contents of the messenger may be managed in a list of the storage box, when an access request of the user terminal is received with respect to the storage box for the conversation contents, the providing unit 212 may provide a conversation contents list 710 stored at the storage box. In this case, when a user selects special conversation contents in the conversation contents list 710, establishing into the conversation window may be made to reconstruct the special conversation contents in a time sequence at actual conversation and replay it in the real-time conversation form.

Figure 8:
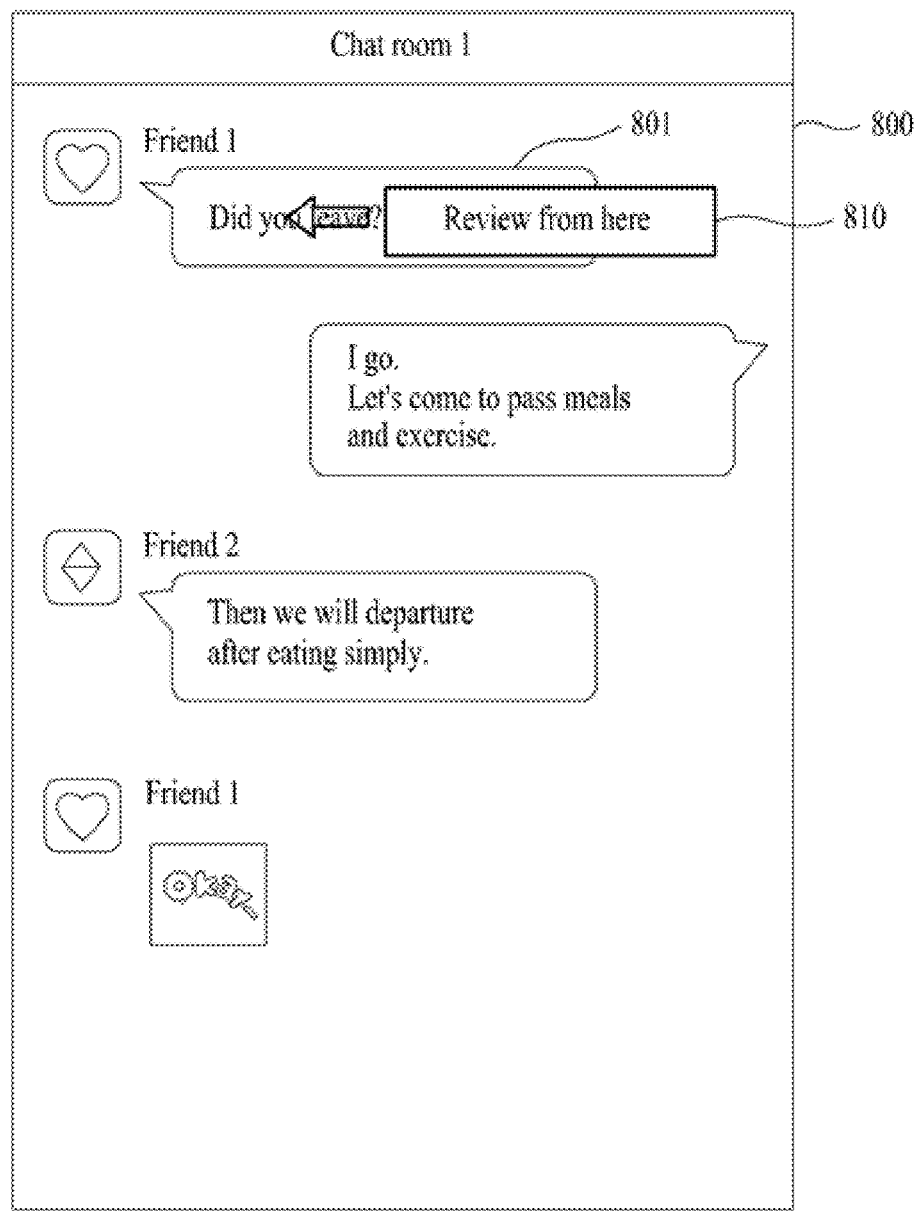

In at least one other example embodiment, referring to FIG. 8, when a special message 801 in a dialog window 800 of the messenger is long touched, a pop-up menu 810 may be executed to review the conversation contents, and in this case, if selecting the pop-up menu 810, the user may reconstruct the conversation contents in a time sequence at real conversation and may replay it in the real-time form.

Figure 9:
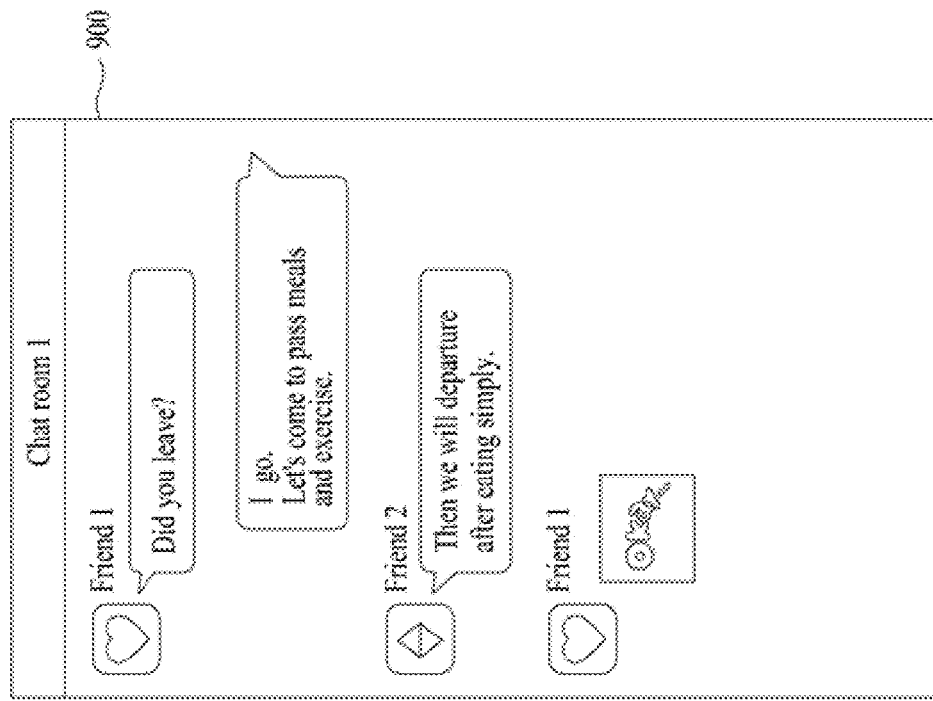
Figure 9:
Figure 9:
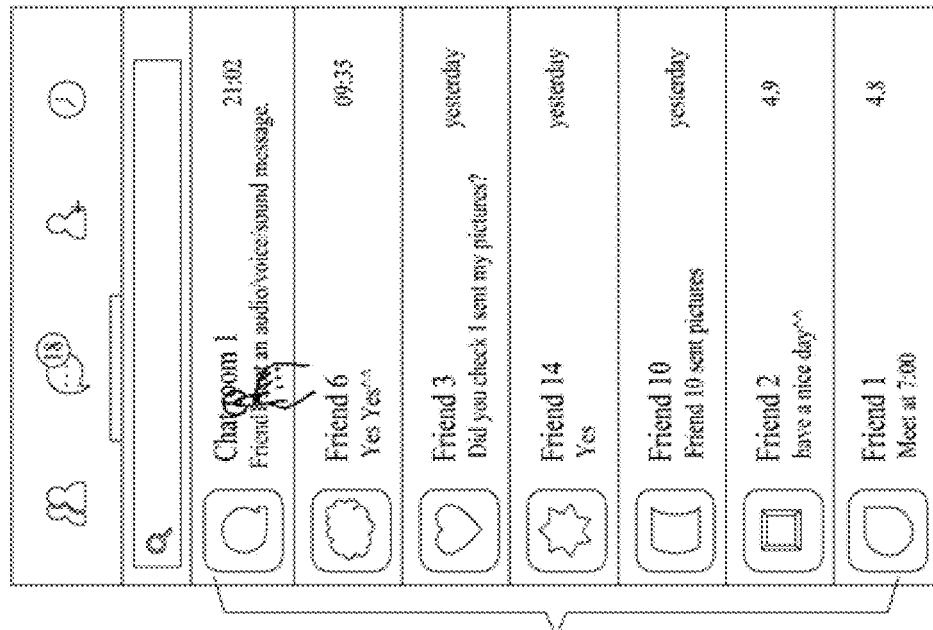

In at least one other example embodiment, referring to FIG. 9, a function for searching for a conversation window or a message in the messenger may be provided. Accordingly, when a keyword is inputted from the user, the providing unit 212 may provide a search result 910 corresponding to the inputted keyword. In this case, when selecting a special conversation window from the search result 910, establishing the dialog window 900 may be made to reconstruct at least a portion of the conversation contents (e.g., conversation contents of the last chat session, a conversation before and after a given or, alternatively, desired or predetermined period, and the like) in a time sequence at real conversation and to replay the contents in a real-time conversation form.

Operations of the contents providing method may be reduced based on detailed description of contents providing system described with reference to FIGS. 1 to 9 or some operation may be added to the contents providing method based on the detailed description of the contents providing system. In addition, two or more operations may be combined, and an order or position of the operations may be changed.

Example screens illustrated in FIGS. 4 to 9 may be to help understanding of the scope and spirit of inventive concepts, but should not be limited thereto. A screen construction, a screen order, and the like may be variously changed or modified.

Figure 10:
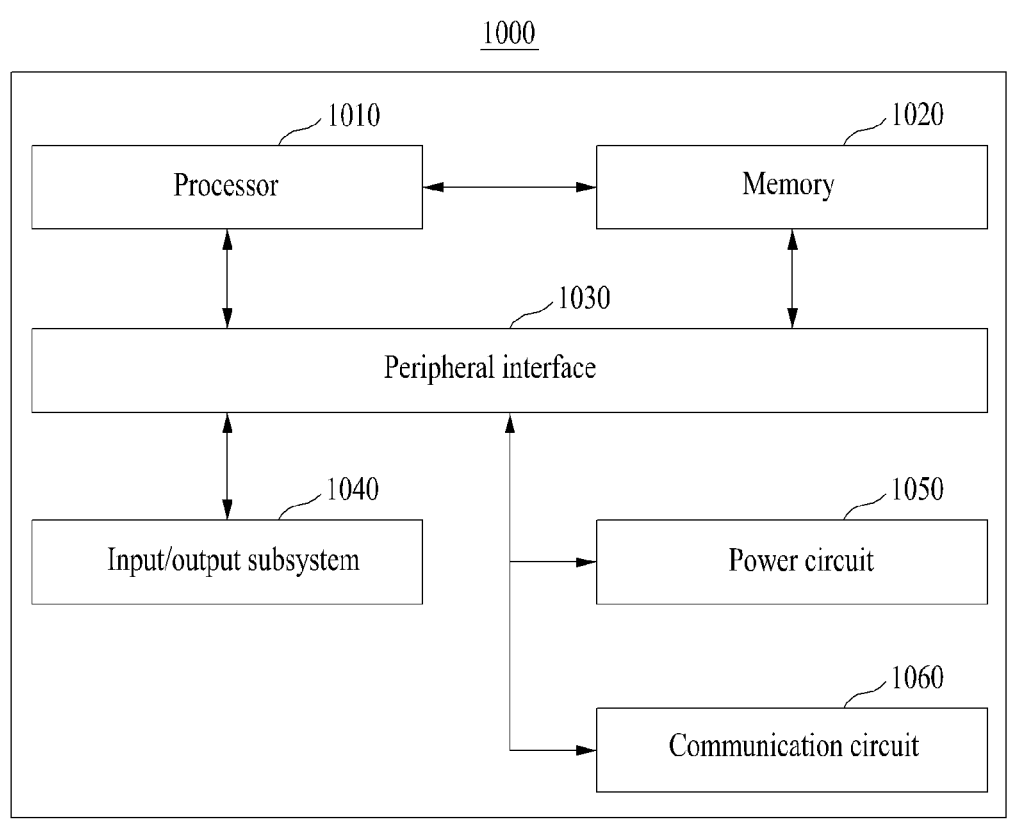
FIG. 10 is a block diagram schematically illustrating an example of an internal configuration of a computer system according to an example embodiment of inventive concepts.

FIG. 10 is a block diagram schematically illustrating an internal configuration of a computer system according to an example embodiment of inventive concepts. As illustrated in FIG. 10, a computer system 1000 may include at least one processor 1010, a memory 1020, a peripheral interface 1030, an input/output subsystem 1040, a power circuit 1050, and a communication circuit 1060. Here, the computer system 1000 may be a user terminal and may include (or may be roughly divided into) an input unit for receiving a conversation section to be stored through a conversation screen of a messenger, a storage unit for storing a conversation unit included in the conversation section, and a control unit for controlling an overall operation of the computer system 1000 to share the stored conversation section or to show it using a dedicated viewer The memory 1020 may include, for example, a high-speed random access memory (RAM), a magnetic disc, a static RAM (SRAM), a dynamic RAM (DRAM), a read only memory (ROM), a flash memory, or a nonvolatile memory. The memory 1020 may include a software module, a command set, or a variety of data necessary for an operation of the computer system. The processor 1010 may control an access to the memory 1020 from the processor 1010 or any other component (e.g., the peripheral interface 1030).

The peripheral interface 1030 may couple a peripheral input and/or output device of the computer system 1000 to the processor 1010 and the memory 1020. The processor 1010 may execute a software module or a command set, stored at the memory 1020 to perform a variety of functions for the computer system 1000, and to process data.

The input/output subsystem 1040 may couple a variety of peripheral input/output devices to the peripheral interface 1030. For example, the input/output subsystem 1040 may include a controller for coupling a monitor, a keyboard, a mouse, a printer, or a peripheral device such as a touch screen, or a sensor, to the peripheral interface 1030. According to another aspect, input/output peripheral devices may be coupled to the peripheral interface 1030 without passing through the input/output subsystem 1040.

All or a part of terminal components of a terminal may be may be powered by the power circuit 1050. For example, the power circuit 1050 may include a power management system, one or more power sources such as a battery or an alternating current (AC), a charging system, a power failure detection circuit, a power converter or inverter, a power status indicator, or any other components for power generation, management, and distribution.

The communication circuit 1060 may communicate with other computer system using at least one external port. As described above, the communication circuit 1060 may include an RF circuit and may communicate with other computer system by transmitting and receiving an RF signal known as an electromagnetic signal.

The computer system 1000 illustrated in FIG. 10 may be only examples. The computer system 1000 may not include some of components illustrated in FIG. 10, or may further include components not illustrated in FIG. 10, or may be implemented such that two or more components are combined. For example, the computer system 1000 for a mobile terminal of a communication environment may include a touch screen, a sensor and the like as well as components illustrated in FIG. 10, and the communication 1060 may include circuits for RF communications such as wireless-fidelity (Wi-Fi), 3G, long term evolution (LTE), Bluetooth, near field communication (NFC), ZigBee and the like. Components capable of being included in the computer system 1000 may be implemented with hardware, including an integrated circuit specialized for one or more signal processing or an application, software, or a combination thereof.

As such, according to at least some example embodiments of inventive concepts, there may be provided a tool for making a messenger conversation form of contents through a messenger, thereby making it possible to provide a new media platform, on which all kinds of stories are created in a messenger form, and for general users and expert writers to easily make the contents. According to example embodiments of inventive concepts, contents constructed in a time line form may be provided at conversation window in a real-time conversation form, thereby making it possible to provide a new type of media through a messenger which users mainly use routinely. According to at least some example embodiments of inventive concepts, when messenger conversation contents are replayed, the conversation contents may be reconstructed in a time sequence so as to be provided in a real-time conversation form. Accordingly, unlike related art methods in which the conversation contents is checked one by one through a scroll, the conversation contents may be reproduced automatically in a time interval when conversation is made in real time, thereby improving realism of the conversation and convenience of a function.

Methods according to one or more example embodiments of inventive concepts may be implemented in the format of program instruction executable through various computer systems and may be recorded at a computer-readable medium.

According to at least one example embodiment of inventive concepts, a program may be configured in an application of a PC-based program or a dedicated mobile terminal. An application according to inventive concepts may be implemented in a program form that operates independently or an in-app form (e.g., a portal service app, a search service app) of a particular application. It may be implemented to allow an operation on the particular application.

In addition, methods according to one or more example embodiments of inventive concepts may be performed by controlling the user terminal by an application associated with a server system for providing a messaging service. For example, these applications may execute one or more processors configured to perform one or more aspects of the features described herein. In addition, these applications may be installed to the user terminal through a file to provide a file distribution system. For example, the file distribution system may include a file transmission unit (not illustrated) to transmit the file according to a request of the user terminal.

The units (or devices) described herein may be implemented using hardware components, software components, and/or a combination thereof. For example, devices and components described therein may be implemented using processing circuitry, such as, a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. The processing circuitry and/or hardware devices (also sometimes referred to herein as a processing device) may be configured as special purpose processing circuitry and/or hardware devices to perform functions illustrated in one or more of the flow charts or sequence diagrams discussed herein.

The processing device may run an operating system (OS) and one or more software applications that run on the OS. The processing device also may access, store, manipulate, process, and create data in response to execution of the software. For the sake of easy understanding, at least some example embodiments of inventive concepts are exemplified as one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Methods according to one or more example embodiments may be implemented in the format of program instruction executable through various computing devices and may be recorded in a non-transitory computer-readable medium. The computer-readable medium may also include program instructions, data files, data structures, and the like independently or in the format of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more modules or units to perform the operations of the above-described example embodiments, and vice versa.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Therefore, other implementations, other example embodiments and equivalent things of claims may be within the scope of the claims to be described later.

While inventive concepts has been described with reference to example embodiments, it will be apparent to those skilled in the art that various changes and modifications may be made without departing from the spirit and scope of inventive concepts. Therefore, it should be understood that the above example embodiments are not limiting, but illustrative.

What is claimed is:

1. A contents providing method implemented with a computer including at least one processor and a memory, the method comprising:

registering contents by matching conversation messages of a conversation between virtual persons created by a first user via a first user terminal with time information received from the first user via the first user terminal, and storing the conversation messages in association with the time information, wherein the time information received from the first user indicates times at which the conversation messages are to occur within a time sequence of the conversation, wherein the conversation messages and the time information are input via a contents creation tool of the first user terminal by the first user, the contents creation tool configured to match the conversation messages with the time information such that the registered contents are reproduced as a conversation form of contents via a messenger application running on a second user terminal or the first user terminal;

receiving, from the second user terminal or the first user terminal, a request for access to the registered contents;

establishing, via the messenger application, a conversation interface with a messenger account related to the registered contents in response to the request for access; and reproducing, via the messenger application, the registered contents as a real-time conversation by providing the conversation messages through the conversation interface in an order corresponding to the time information at times within a time sequence of the reproducing that respectively correspond to the times at which the conversation messages are to occur within the time sequence of the conversation as indicated by the time information;

wherein the reproducing of the registered contents as the real-time conversation occurs after an end of inputting the conversation into the contents creation tool by the first user.

2. The contents providing method of claim 1, wherein the matching matches the conversation messages with conversation times in the messenger application; and the storing stores the matched conversation messages.

3. The contents providing method of claim 1, wherein the reproducing the registered contents comprises:
   reconstructing the conversation messages in a time sequence matched to the conversation messages provided through the conversation interface; and
   displaying the reconstructed conversation messages sequentially based on time intervals between the conversation messages.

4. The contents providing method of claim 1, further comprising:
   displaying advertisement information related to the registered contents through the conversation interface.

5. The contents providing method of claim 1, further comprising:
   displaying an advertisement among the registered contents while reproducing the registered contents.

6. The contents providing method of claim 5, further comprising:
   selecting the advertisement according to a keyword included in the conversation messages.

7. The contents providing method of claim 1, wherein the establishing a conversation interface comprises:
   establishing the conversation interface at a time corresponding to a set reproduction time for the registered contents.

8. The contents providing method of claim 1, wherein the establishing a conversation interface comprises:
   establishing the conversation interface in response to selection of a conversation message from a storage box in which the conversation messages are stored.

9. The contents providing method of claim 1, wherein the establishing a conversation interface comprises:
   establishing the conversation interface in response to selection of at least one of a special conversation interface or a special conversation message, the selection of the at least one of the special conversation interface or the special conversation message resulting from a search for the at least one of the special conversation interface or the special conversation message on the messenger application, wherein
   the conversation interface at least one of (i) is the special conversation interface or (ii) includes the special conversation message.

10. A contents providing method implemented by a computer including at least one processor and a memory, the method comprising:
    establishing, via a messenger application and based on a request for reproducing contents, a conversation interface with a messenger account related to the contents, the contents including conversation messages of a conversation between virtual persons created by a first user via a first user terminal matched with time information received from the first user via the first user terminal, wherein the time information received from the first user indicates times at which the conversation messages are to occur within a time sequence of the conversation; and
    reproducing, via the messenger application, the contents as a real-time conversation by displaying the conversation messages through the conversation interface sequentially in an order corresponding to the time information at times within a time sequence of the reproducing that respectively correspond to the times at which the conversation messages are to occur within the time sequence of the conversation as indicated by the time information,
    wherein the conversation messages and the time information are input via a contents creation tool of the first user terminal by the first user, the contents creation tool configured to match the conversation messages with the time information such that the reproducing reproduces the contents as a conversation form of contents via the messenger application running on a second user terminal or the first user terminal,
    wherein the reproducing of the registered contents as the real-time conversation occurs after an end of inputting the conversation into the contents creation tool by the first user.

11. A contents providing system comprising:
    a memory having computer-readable instructions stored therein; and
    at least one processor configured to execute the computer-readable instructions to
      register contents by matching conversation messages of a conversation between virtual persons created by a first user via a first user terminal with time information received from the first user via the first user terminal, and storing the conversation messages in association with the time information, wherein the time information received from the first user indicates times at which the conversation messages are to occur within a time sequence of the conversation, wherein the conversation messages and the time information are input via a contents creation tool of the first user terminal by the first user, the contents creation tool configured to match the conversation messages with the time information such that the registered contents are reproduced as a conversation form of contents via a messenger application running on a second user terminal or the first user terminal,
      provide, via the messenger application, a conversation interface with a messenger account related to the registered contents in response to a request for access to the registered contents; and
      reproduce, via the messenger application, the registered contents as a real-time conversation by providing the conversation messages through the conversation interface in an order corresponding to the time information at times within a time sequence of the reproducing that respectively correspond to the times at which the conversation messages are to occur within the time sequence of the conversation as indicated by the time information,
      wherein the reproducing of the registered contents as the real-time conversation occurs after an end of inputting the conversation into the contents creation tool by the first user.

12. The contents providing system of claim 11, wherein the at least one processor is further configured to execute the computer-readable instructions to match the conversation messages with conversation times in the messenger application; and store the matched conversation messages in the memory.

13. The contents providing system of claim 11, wherein the at least one processor is further configured to execute the computer-readable instructions to reconstruct the conversation messages in a time sequence matched to the conversation messages provided through the conversation interface; and display the reconstructed conversation messages sequentially based on time intervals between the conversation messages.

14. The contents providing system of claim 11, wherein the at least one processor is further configured to execute the computer-readable instructions to display advertisement information related to the registered contents through the conversation interface.

15. The contents providing system of claim 14, wherein the advertisement information includes at least one of an advertisement inserted at a first time among the reproduced contents; or an advertisement selected according to a keyword included in the conversation messages.

16. The contents providing system of claim 11, wherein the at least one processor is further configured to execute the computer-readable instructions to provide the conversation interface at a time corresponding to a set reproduction time for the registered contents.

17. The contents providing system of claim 11, wherein the conversation interface includes a special conversation message; and the at least one processor is further configured to execute the computer-readable instructions to provide the conversation interface including the special conversation message in response to selection of the special conversation message from one of (i) a search result for the special conversation message on the messenger application or (ii) a storage box in which the special conversation message of the messenger application is stored.

18. A contents providing method implemented with a computer including at least one processor and a memory, the method comprising:

registering contents of a conversation by matching conversation messages of virtual persons created by a first user via a first user terminal with time information received from the first user via the first user terminal, and storing the conversation messages in association with the time information, wherein the conversation messages and the time information are input via a contents creation tool of the first user terminal by the first user, the contents creation tool configured to match the conversation messages with the time information such that the registered contents are reproduced as a conversation form of contents via a messenger application running on a second user terminal or the first user terminal, wherein the time information is specified by the first user and the time information includes time points to reproduce the registered contents including the conversation messages;

receiving, from the second user terminal or the first user terminal, a request for access to the registered contents;

establishing, via the messenger application, a conversation interface with a messenger account related to the registered contents in response to the request for access; and reproducing, via the messenger application, the registered contents as a real-time conversation based on the time information by providing the conversation messages through the conversation interface in an order corresponding to the time information and at time points included in the time information.

* * * * *